March 27, 1945.          C. E. NELSON          2,372,629
VALVE
Filed Nov. 13, 1943

Inventor
Clarence E. Nelson

By
E. V. Hardeway,
Attorney

Patented Mar. 27, 1945

2,372,629

UNITED STATES PATENT OFFICE 2,372,629

VALVE

Clarence E. Nelson, Houston, Tex., assignor of one-third to E. W. Pearce and one-third to Paul Clark, both of Harris County, Tex.

Application November 13, 1943, Serial No. 510,215

3 Claims. (Cl. 251—127)

This invention relates to a valve assembly.

An object of the invention is to provide a novel type of valve seat having a removable insert which is securely retained in the seat but which may be readily removed therefrom, when desired, for repairs or replacements.

It is a further object of the invention to provide in an assembly of the character described, a novel type of valve embodying a resilient ring which is clamped to the body of the valve in a novel manner.

With the above and other objects in view the invention has particular relation to certain novel features of construction, arrangement of parts and use, an example of which is given in this specification and illustrated in the accompanying drawing, wherein.

Figure 1:
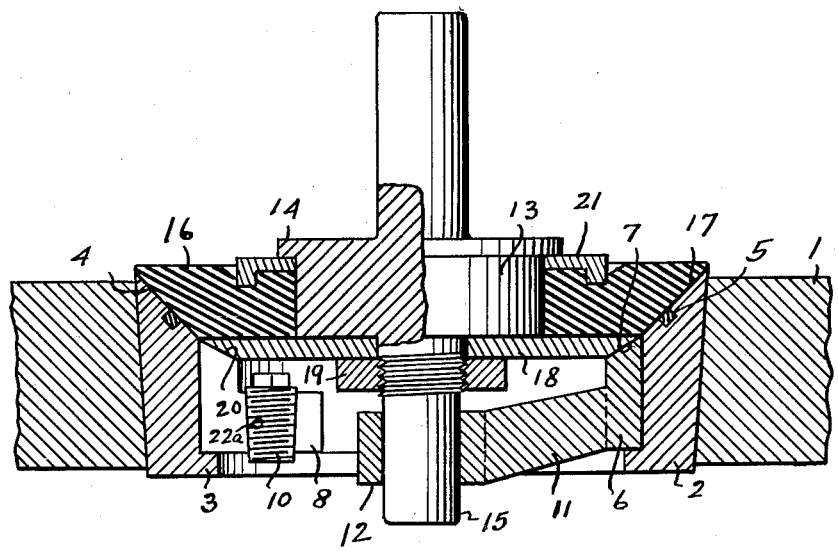
Figure 1 shows a vertical, sectional view of the assembly.
Figure 3:
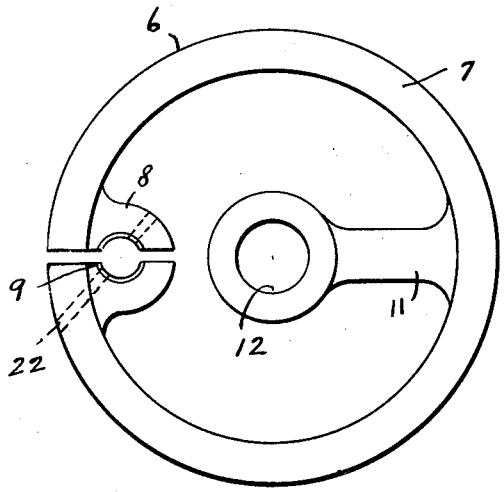
Figure 3 shows a plan view of the seat insert.
Figure 2:
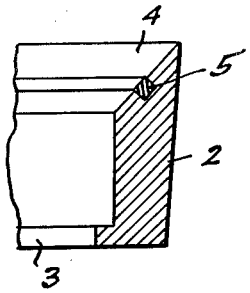
Figure 2 shows a fragmentary, sectional view of the seat.

In the drawing, the numeral 1 designates the partition of the pump in which the assembly is located. Secured in the pump is the annular valve seat 2 one end of which is provided with an internal, annular shoulder 3 and whose other end has the outwardly flared, annular face 4. Countersunk into this face is a resilient seal ring 5 which extends slightly beyond the face 4. The numeral 6 designates an annular insert which is fitted within the seat 2 and rests on the shoulder 3. It's exposed end is formed with an annular tapering face 4. The insert 6 is open on one side so as to be readily expansible. At its open side the free ends of the insert are formed with a split boss 8 provided with a tapering tapped hole 9 to receive a tapering threaded expander 10. It is not essential that the hole 9 and expander 10 be threaded. They may be formed without threads and the expander driven into the hole 9. When the expander 10 is inserted into the opening 9 and moved to home position the insert will be expanded and upon removal of the expander 10 the insert will readily contract.

It will thus be seen that when the insert is seated on the shoulder 3 and the expander 10 inserted and moved to home position in the hole 9 the insert will be expanded and securely held in the seat 2 and will not be readily loosened during the operation of the valve.

The insert has a radial inwardly extended arm 11 formed integrally therewith whose inner end is provided with a bearing 12. The numeral 13 designates a cylindrical valve body whose upper end is formed with an outwardly extended annular flange 14. The body has the stem 15 which works through the bearing 12. Around the body there is an annular resilient ring 16 preferably formed of rubber. The outer margin of the ring 16 is formed with an annular tapering face 17 conforming in pitch to the pitch of the face 4 and cooperating therewith. On the stem 15 and clamping against one side of the body 13 and ring 16 there is a clamp plate 18 which is secured in position by the locknut 19 which is screwed onto said stem. The outer margin of the clamp plate 18 has an annular tapering face 20 which conforms in pitch to, and which is arranged to cooperate with, the face 7.

Fitted closely around the body 13 and abutting the flange 14 there is a clamp ring 21 whose outer margin is downwardly turned and countersunk into the material of the ring 16 as shown in Figure 1. The ring 16 is thus securely clamped in place but may be readily removed, for replacement, by removing the lock nut 19.

It may be noted that when the insert 6 is secured in place the expander 10 may be keyed against coming loose, by means of a suitable key to be passed through the aligned keyways 22, 22a in the insert and expander, respectively.

The drawing and description are illustrative merely, while the broad principle of the invention will be defined by the appended claims.

What I claim is:

1. A valve assembly comprising a split ring insert of substantially the same cross sectional area throughout, means at the split for expanding the ring circumferentially, a radial arm integrally connected at its outer end to the ring, the inner end of the arm being free and provided with a bearing, a valve seat around the insert which has an inside frusto-conical surface, a valve, an extended stem on the valve which is fitted in the bearing, said valve having an annular resilient sealing member provided with a tapering surface confronting the conical surface of said seat, a clamp plate for retaining the resilient member on the valve, said insert and clamp plate having annular tapering faces which fit closely together when the valve is closed.

2. A valve assembly comprising an annular valve seat having an annular flared seating face, a split ring insert within said seat and having a flared seating face of less pitch than, and merging into, the seating face of the valve seat, means for expanding said insert circumferentially to secure it firmly within said seat, a radial arm integrally connected at its outer end to the insert and whose inner end is free and provided with a bearing, a valve formed with a body and having thereon an annular resilient sealing member provided with an annular tapering face shaped to fit closely against the seating face of the valve seat when the valve is closed, an extended stem on the body which works through said bearing, a clamp plate secured on the stem for retaining the resilient member in assembled relation with the body, the outer margin of the clamp plate being tapered to conform to the taper of and to fit closely against, the tapered face of the insert when the valve is closed.

3. A valve assembly comprising an annular valve seat one end of which is provided with an internal annular shoulder and whose other end is provided with an annular flared seating face, a split ring insert within said seat and abutting said shoulder and having a flared seating face of less pitch than, and merging into, the seating face of the valve seat, means for expanding said insert circumferentially to secure it firmly within said seat, a radial arm integrally connected at its outer end to the insert and whose inner end is free and provided with a bearing, a valve formed with a body and having thereon an annular resilient sealing member provided with an annular tapering face shaped to fit closely against the seating face of the valve seat when the valve is closed, an extended stem on the body which works through said bearing, a clamp plate secured on the stem for retaining the resilient member in assembled relation with the body, the outer margin of the clamp plate being tapered to conform to the taper of, and to fit closely against, the tapered face of the insert when the valve is closed.

CLARENCE E. NELSON.